(12) United States Patent
Daniels et al.

(10) Patent No.: US 8,904,185 B2
(45) Date of Patent: Dec. 2, 2014

(54) PRESENCE SENSING INFORMATION SECURITY

(75) Inventors: Fonda Daniels, Cary, NC (US); David B. Kumhyr, Austin, TX (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 3248 days.

(21) Appl. No.: 10/985,314

(22) Filed: Nov. 10, 2004

(65) Prior Publication Data

US 2006/0101275 A1    May 11, 2006

(51) Int. Cl.
*G06F 21/00* (2013.01)
*G06F 21/35* (2013.01)

(52) U.S. Cl.
CPC ..................................... *G06F 21/35* (2013.01)
USPC ....................................................... 713/182

(58) Field of Classification Search
USPC ....................................................... 713/182
See application file for complete search history.

(56) References Cited

U.S. PATENT DOCUMENTS

| | | | | |
|---|---|---|---|---|
| 5,757,271 A * | 5/1998 | Andrews | ..................... | 340/568.1 |
| 6,002,427 A * | 12/1999 | Kipust | ............................ | 348/156 |
| 6,418,424 B1 * | 7/2002 | Hoffberg et al. | ................ | 706/21 |
| 6,587,949 B1 * | 7/2003 | Steinberg | ...................... | 713/193 |
| 6,766,456 B1 * | 7/2004 | McKeeth | ........................... | 726/2 |
| 7,058,814 B1 * | 6/2006 | Zimmerman | ................. | 713/178 |
| 7,134,130 B1 * | 11/2006 | Thomas | ........................... | 725/25 |
| 7,197,638 B1 * | 3/2007 | Grawrock et al. | ............. | 713/165 |
| 7,346,769 B2 * | 3/2008 | Forlenza et al. | ............... | 713/151 |
| 2002/0005774 A1 | 1/2002 | Rudolph et al. | | |
| 2002/0031230 A1 * | 3/2002 | Sweet et al. | ................... | 380/278 |
| 2003/0108202 A1 | 6/2003 | Clapper | | |
| 2003/0204721 A1 | 10/2003 | Barrus et al. | | |
| 2004/0015610 A1 | 1/2004 | Treadwell | | |
| 2004/0049687 A1 * | 3/2004 | Orsini et al. | ................... | 713/189 |
| 2004/0078596 A1 * | 4/2004 | Kent et al. | ...................... | 713/201 |
| 2004/0250084 A1 * | 12/2004 | Hamid | ........................... | 713/186 |
| 2004/0257202 A1 * | 12/2004 | Coughlin et al. | ............. | 340/5.82 |
| 2005/0039040 A1 * | 2/2005 | Ransom et al. | ............... | 713/200 |
| 2005/0044382 A1 * | 2/2005 | McKeeth | ........................ | 713/182 |
| 2006/0005042 A1 * | 1/2006 | Black | ............................ | 713/186 |

OTHER PUBLICATIONS

Biometric Technology, Voice Security Systems—Biometric Technology.
Stop Unauthorized Access With Link-IT; Wavetrend Technologies, Inc.; Secure-IT.

* cited by examiner

*Primary Examiner* — Teshome Hailu
(74) *Attorney, Agent, or Firm* — Steven M. Greenberg, Esq.; CRGO Law

(57) ABSTRACT

A method, system and apparatus for presence sensing security. A presence sensing security method can include the step of securing access to only a portion of a computing device based upon the presence of at least one of an authorized user and an unauthorized user. The securing step can include securing content of selected applications of the computing device based upon the presence of at least one of an authorized user and an unauthorized user. Additionally, the securing step can include securing access to selected files in the computing device based upon the presence of at least one of an authorized user and an unauthorized user.

10 Claims, 3 Drawing Sheets

PRESENCE SENSING INFORMATION SECURITY

BACKGROUND OF THE INVENTION

1. Statement of the Technical Field

The present invention relates to the field of biometric computer security and more particularly to presence sensing computer security.

2. Description of the Related Art

Biometric technology relates to the automated identification or authentication of the identity of a living person based upon physical or behavioral characteristics. Unique physical traits include fingerprints, iris imagery, voice prints, facial features, signatures and hand geometry. As such, in the biometric sciences, each can be used to authenticate or identify a person. To utilize biometric data in a security application, first an authorized individual can be enrolled—namely respective biometric data can be acquired and stored. Subsequently, when a need for authorization or validation arises, contemporaneous biometric data can be collected and compared to the stored biometric data to determine if a match has occurred. If so, access can be granted. Otherwise, access can be denied.

While biometric technology likely will play a leading role in computing security in the future, significant limitations exist in respect to biometric technology. First, once a user has been authorized and validated based upon matching biometric data, the user can freely access the resources of a computing device. No additional validation or authentication will be required, unless of course, the user disconnects or otherwise "logs out" of the computing device, necessitating a new log on procedure. Many instances can arise, however, where it would be desirable to elevate a secure posture of a computing device, even once a user has been authenticated and validated.

For example, while the privacy of files can be presumed when a computing user interacts with a computing device alone, in many cases, other persons can be within visual range of important data leading to a less than secure environment. Moreover, oftentimes computing users can temporarily leave the vicinity of a computing device once validated such as to use the restroom or to talk to another person elsewhere. In that circumstance, file access can be had by anyone choosing to interact with the exposed computing platform.

To address the latter problem, "presence" detection has been proposed in which the computing platform can detect the presence of an authorized user responsive to which the computing platform can permit unfettered interactions with the computing platform. When the computing platform detects a loss of presence of the authorized user, the computing platform can become "locked" and a screen saver application can obscure from view any information displayed through the computing platform. In this way, end users can remain free to leave the vicinity of a workstation without fear of a breach of security.

Nevertheless, in many occasions it can be desirable to implement selective security while remaining in the presence of a computing platform. For instance, a computing user can engage in a chat session which contents may be confidential. When others enter the vicinity of the computing platform, the confidentiality of the chat session can become compromised. Similarly, others may be granted access to non-confidential materials in the computing platform temporarily. While generally access is to be permitted, the access can have the undesirable consequence of also providing access to confidential materials.

SUMMARY OF THE INVENTION

The present invention addresses the deficiencies of the art in respect to biometric security and provides a novel and non-obvious method, system and apparatus for presence sensing security. A presence sensing security method can include the step of securing access to only a portion of a computing device based upon the presence of at least one of an authorized user and an unauthorized user. The securing step can include securing content of selected applications of the computing device based upon the presence of at least one of an authorized user and an unauthorized user. Additionally, the securing step can include securing access to selected files in the computing device based upon the presence of at least one of an authorized user and an unauthorized user.

In a particular aspect of the invention, the securing step can include the step of masking content of selected applications of the computing device based upon the presence of at least one of an authorized user and an unauthorized user. In particular, the masking step can include the step of masking messages in a messaging client in the computing device based upon the presence of at least one of an authorized user and an unauthorized user. The securing step yet further can include encrypting selected files in the computing device based upon the presence of at least one of an authorized user and an unauthorized user.

In yet another aspect of the invention, the method can include the steps of determining whether a third party user has been authorized to interact with the computing device when the authorized user is not present; and, if so, securing the computing device excepting for a portion authorized for use by the third party user. For example, the securing step can include securing access to only a portion of a computing device based upon detecting the presence of a radio frequency identification tag associated with at least one of an authorized user and an unauthorized user. Other presence detection technologies also can play a role in the securing step, for instance smart card technologies. Finally, the securing step can include securing access to only a portion of a computing device based upon a manual specification of the presence of at least one of an authorized user and an unauthorized user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for presence sensing information security. In accordance with the present invention, the presence of a designated user can be detected in proximity to a computing device. When the presence of the designated user no longer can be detected, security measures can be applied to the computing device. Such measures include the masking of message content in a messaging system, or the encryption or password protecting of selected files or file directories. Notwithstanding, if a guest user enjoys access to a particular resource, the security measures can be applied to the computing device excepting for the resources utilized by the guest user. In any event, when the presence of the designated user can be detected once again, the security measures can be lifted.

Figure 1:
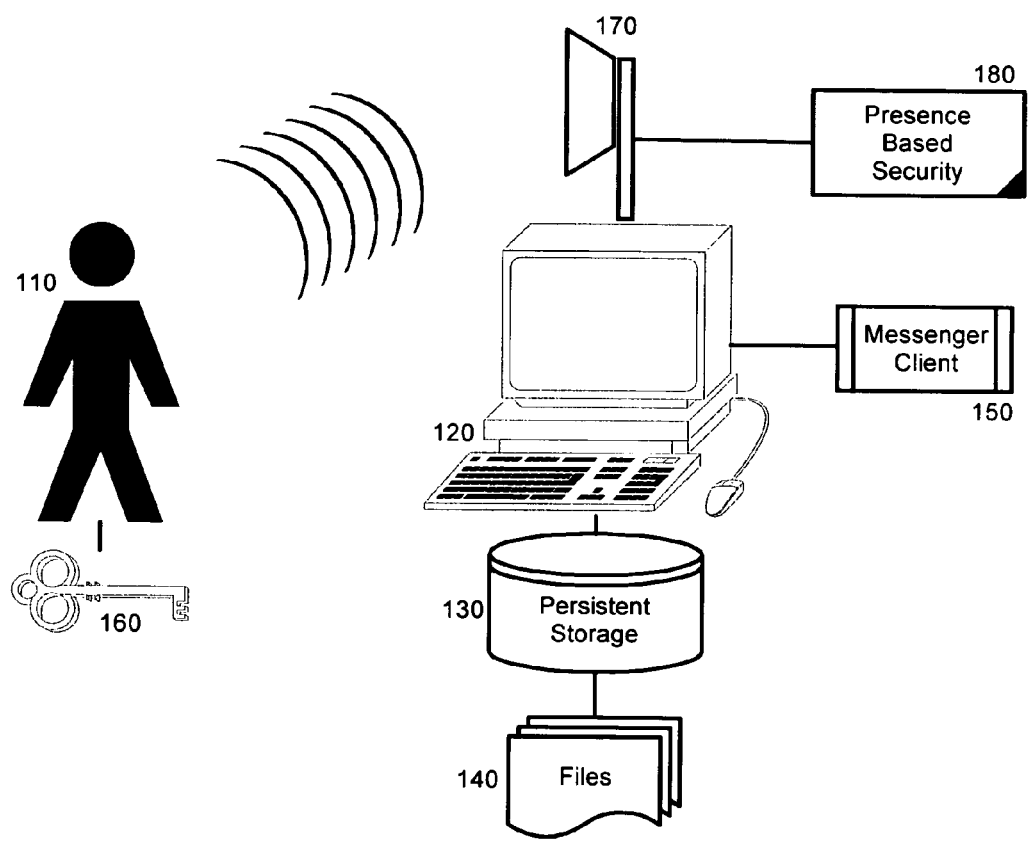
FIG. 1 is a schematic illustration of a method, system and apparatus for presence sensing information security.

In further illustration of the foregoing inventive arrangements, FIG. 1 is a schematic illustration of a method, system and apparatus for presence sensing information security. The system can include a protected computing device 120 having persistent storage 130 with files and file directories 140 stored thereon. The protected computing device 120 also can include one or more applications, for instance a messenger client 150. Importantly, the protected computing device 120 can include presence detecting circuitry 170 and presence based security logic 180. The presence detecting circuitry 170 can include circuitry suitable for sensing the presence of a sensor device 160, examples of which include a radio frequency identification tag, a magnetic sensor, or a smart card, to name a few, as is well-known in the retail security arts.

Notably, the presence based security logic 180 can include programming for responding the detection and lack of detection of the sensor device 160. In accordance with the present invention, when the presence detecting circuitry 170 detects the presence of the sensor device 160, the presence based security logic 180 can permit an associated user 110 to access the protected computing device 120. Yet, when the presence detecting circuitry 170 no longer can detect the presence of the sensor device 160, the presence based security logic 180 can impose security measures upon selected resources of the protected computing device 120. The security measures can include the masking of content in the messenger client 150, the selective encryption or password protection of one or more of the files and file directories 140 in persistent storage 130, and the disabling of hardware/peripheral devices such as printers or attached storage.

Figure 2:
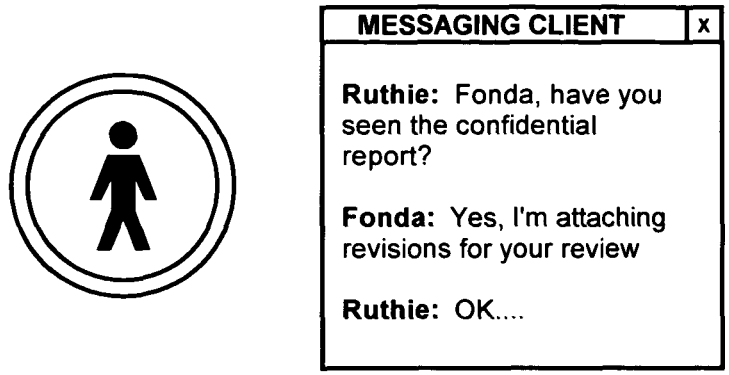
FIG. 2 is a pictorial representation of the system of FIG. 1 performing presence sensing message security; and, FIG. 3 is a flow chart illustrating a process for presence sensing information security for use in the system of FIG. 1.
Figure 2:
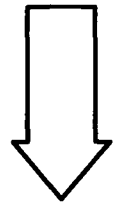
Figure 2:
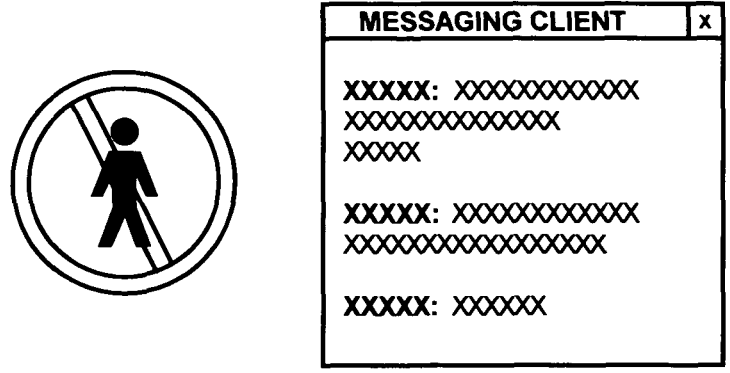

Referring specifically to the messenger client 150, FIG. 2 is a pictorial representation of the system of FIG. 1 performing presence sensing message security. As it will be apparent from the illustration of FIG. 2, when the presence of a designated end user can be detected, the messenger client can operate normally as if no security measures have been imposed. As part of the normal operation of the messenger client, the visual content of the messenger client can be rendered in the messenger client. Nevertheless, once the presence of the end user no longer can be detected, the visual content can be masked such that others within visual range of the messenger client cannot comprehend the visual content.

Importantly, referring once again to FIG. 1, presence detection is not limited strictly to the remote sensing of the sensing device 160 associated with the designated end user 110. Rather, in a particular aspect of the invention, the security measures can be applied responsive to a manual indication either of a loss of presence of the designated end user 110, or a new presence of an unauthorized end user (not shown). Specifically, when an unauthorized end user becomes within visual range of the computing device 120, the designated end user 110 can so indicate to the presence based detection logic 180 in order to trigger the activation of security measures. Of course, the detection of the unauthorized end user can be automated utilizing sensing devices associated with the unauthorized end users.

Figure 3:
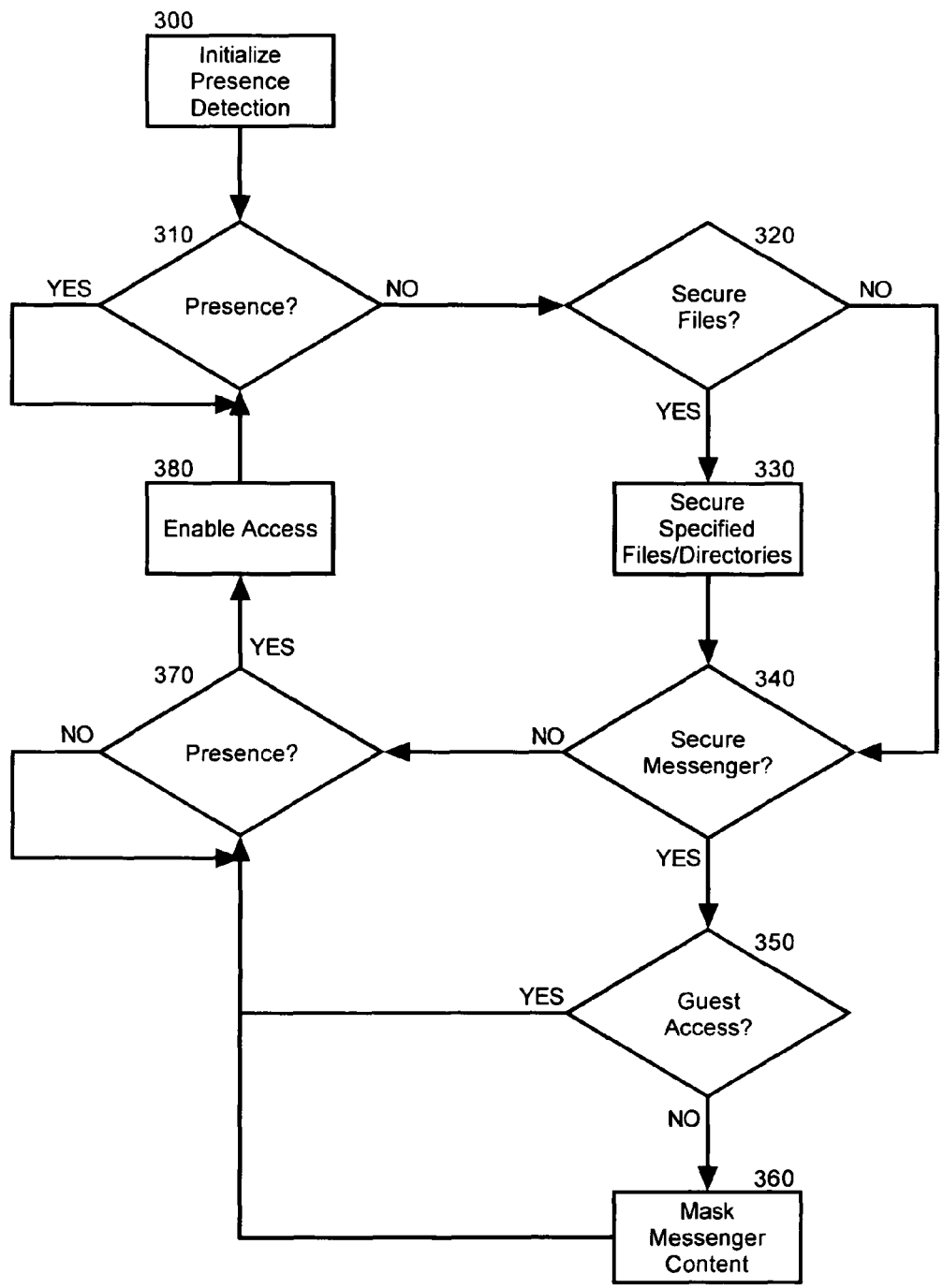

In more particular illustration, FIG. 3 is a flow chart illustrating a process for presence sensing information security for use in the system of FIG. 1. The process can begin in block 300 where the presence detection logic can be initialized. In decision block 310, it can be determined whether the designated end user is present and within acceptable proximity of the protected computing device. If so, no action need be taken. Otherwise, in decision block 320, it can be determined whether an appropriate response to the lack of presence is to secure one or more designated files or file directories in the protected computing device. If so, in block 330, one or more designated files or file directories can be secured in the protected computing device, for instance by way of encryption or password protection.

In decision block 340, it further can be determined whether an appropriate response to the lack of presence is to secure the accessible content of one or more applications, include a messaging client for example, an instant messenger, a chat client, and the like. If so, in decision block 350, it yet further can be determined if another user has been granted guest access to the applications. If not, the content of the applications can be masked in block 360. In any case, in decision block 370 it can be determined whether the presence of the designated user can be detected. If so, in block 380 access to the protected computing device can be re-enabled and the process can begin anew in block 310.

Importantly, it is to be recognized by the skilled artisan that the presence based security measures can be undertaken manually at the behest of the designated user, automatically when it is determined that the designated user no longer is in the presence of the protected computing device, or automatically when it is determined that an unauthorized user has entered the presence of the protected computing device. Yet, the entirety of the protected computing device need not be secured—particularly where an authorized third party has been granted access to at least a portion of the protected computing device such as a document editor. In that circumstance, selected files can be secured and the content of a messenger can be masked while the document editor can remain operable.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A presence sensing security method comprising the steps of:
   detecting in proximity to a display of a computing device a presence of at least one of an authorized user and an unauthorized user;
   securing visual content of one or more messages in a messenger client executing in the computing device by masking the visual content of the one or more messages in only a portion of the display of the computing device in response to detecting the presence of the unauthorized user while permitting access to other portions of the display of the computing device despite the presence of the unauthorized user; and,
   performing, based upon the presence of the at least one of the authorized user and the unauthorized user, an additional security measure selected from the group consisting of securing access to one or more selected files or directories in said computing device by encrypting said selected files or directories in said computing device and disabling a hardware peripheral device.

2. The method of claim 1, further comprising the steps of:
   determining whether a third party user has been authorized to interact with the computing device when the authorized user is not present; and,
   if so, securing the computing device excepting for a portion of the computing device authorized for use by the third party user.

3. The method of claim 1, further comprising securing access to only a portion of the computing device based upon detecting the presence of a radio frequency identification tag associated with the at least one of the authorized user and the unauthorized user.

4. The method of claim 1, further comprising securing access to only a portion of the computing device based upon a manual specification of the presence of the at least one of the authorized user and the unauthorized user.

5. A presence sensing security system comprising:
   presence detecting circuitry executing in a protected computing device configured to detect a sensing device; and,
   presence based security logic coupled to the protected computing device and programmed to respond to a detection of a presence of unauthorized user by securing visual content of one or more messages in a messenger client by masking the visual content of the one or more messages in only a portion of a display of the protected computing device while permitting access to other portions of the display of the protected computing device despite the presence of the unauthorized user and to perform, based upon the presence of the at least one of the authorized user and the unauthorized user, an additional security measure selected from the group consisting of securing access to one or more selected files or directories in said computing device by encrypting said selected files or directories in said computing device and disabling a hardware peripheral device.

6. The system of claim 5, wherein the sensing device is a radio frequency identification tag.

7. A machine readable storage device having stored thereon a computer program for presence sensing security, the computer program comprising a routine set of instructions which when executed by a computing device causes the computing device to perform the steps of:
   detecting in proximity to a display of the computing device a presence of at least one of an authorized user and an unauthorized user;
   securing visual content of one or more messages in a messenger client executing in the computing device by masking the visual content of the one or more messages in only a portion of the display of the computing device in response to detecting the presence of the unauthorized user while permitting access to other portions of the display of the computing device despite the presence of the unauthorized user; and,
   performing, based upon the presence of the at least one of the authorized user and the unauthorized user, an additional security measure selected from the group consisting of securing access to one or more selected files or directories in said computing device by encrypting said selected files or directories in said computing device and disabling a hardware peripheral device.

8. The machine readable storage device of claim 7, further comprising an additional set of instructions which when executed by the computing device cause the computing device to further perform the steps of:
   determining whether a third party user has been authorized to interact with the computing device when the authorized user is not present; and,
   if so, securing the computing device excepting for a portion computing device authorized for use by the third party user.

9. The machine readable storage device of claim 7, further comprising the step of securing access to only a portion of the computing device based upon detecting the presence of a radio frequency identification tag associated with the at least one of the authorized user and the unauthorized user.

10. The machine readable storage device of claim 7, further comprising the step of securing access to only a portion of the computing device based upon a manual specification of the presence of the at least one of the authorized user and the unauthorized user.

* * * * *